(12) United States Patent
Basudhar

(10) Patent No.: US 9,852,235 B2
(45) Date of Patent: Dec. 26, 2017

(54) MULTI-OBJECTIVE DESIGN OPTIMIZATION USING ADAPTIVE CLASSIFICATION

(71) Applicant: Livermore Software Technology Corporation, Livermore, CA (US)

(72) Inventor: Anirban Basudhar, Livermore, CA (US)

(73) Assignee: Livermore Software Technology Corp., Livermore, CA (US)

( * ) Notice: Subject to any disclaimer, the term of this patent is extended or adjusted under 35 U.S.C. 154(b) by 610 days.

(21) Appl. No.: 14/502,715

(22) Filed: Sep. 30, 2014

(65) Prior Publication Data

US 2016/0092606 A1 Mar. 31, 2016

(51) Int. Cl.
G06F 17/50 (2006.01)

(52) U.S. Cl.
CPC .......... *G06F 17/50* (2013.01); *G06F 2217/08* (2013.01)

(58) Field of Classification Search
CPC ...................................................... G06F 17/50
USPC .............................................................. 703/1
See application file for complete search history.

(56) References Cited

U.S. PATENT DOCUMENTS

| 7,428,713 | B1 * | 9/2008 | Roux | G06F 17/5018 716/132 |
| 2009/0014841 | A1 * | 1/2009 | Yanagidaira | G11C 5/02 257/618 |
| 2009/0071986 | A1 * | 3/2009 | Wang | G01F 11/026 222/333 |
| 2014/0137069 | A1 * | 5/2014 | Duff | H03H 11/1221 716/132 |

OTHER PUBLICATIONS

Yanpei Chen, Dedign Implications for Enterprise Storage Systems via Multi-Dimensional Trace Analysis, 2011.*
Yun, et al. "Using Support Vector Machines in Multi-Objective Optimization" 0-7803-8359-1/04, 2004 IEEE.
Stander "An Adaptive Surrogate-Assisted Strategy for Multi-Objective Optimization", 10th World Congress on Structural and Multidisciplinary Optimization, May 19-24, 2013, Orlando, FL.

* cited by examiner

*Primary Examiner* — Lechi Truong
(74) *Attorney, Agent, or Firm* — Roger H. Chu

(57) ABSTRACT

Definition of a design space and an objective space for conducting multi-objective design optimization of a product is received in a computer system having a design optimization application module installed thereon. Design space is defined by design variables while objective space is defined by design objectives. First set of designs in the design space is selected. Each of the first set is evaluated in the objective space for non-dominance. Design space is partitioned into first and second regions using a multi-dimensional space division scheme (e.g., SVM). The first region is part of the design space containing all of the non-dominated design alternatives while the second region contains remaining of the design space. Second set of designs is selected within the first region. Each of the second set and existing non-dominated design alternatives are evaluated for non-dominance. Multi-objective optimization repeats the partition and evaluation until an end condition is reached.

17 Claims, 11 Drawing Sheets

MULTI-OBJECTIVE DESIGN OPTIMIZATION USING ADAPTIVE CLASSIFICATION

FIELD

The present invention generally relates to engineering design optimization, more particularly a multi-objective design optimization using adaptive classification for selecting design alternatives.

BACKGROUND

Today, computer aided engineering (CAE) has been used for supporting engineers in tasks such as analysis, simulation, design, manufacture, etc. In a conventional engineering design procedure, CAE analysis (e.g., finite element analysis (FEA), finite difference analysis, meshless analysis, computational fluid dynamics (CFD) analysis, modal analysis for reducing noise-vibration-harshness (NVH), etc.) has been employed to evaluate responses (e.g., stresses, displacements, etc.). Using automobile design as an example, a particular version or design of a car is analyzed using FEA to obtain the responses due to certain loading conditions. Engineers will then try to improve the car design by modifying certain parameters or design variables (e.g., thickness of the steel shell, locations of the frames, etc.) based on specific objectives and constraints. Another FEA is conducted to reflect these changes until a "best" design has been achieved. However, this approach generally depends on knowledge of the engineers or based on a trial-or-error method.

Furthermore, as often in any engineering problems or projects, these objectives and constraints are generally in conflict and interact with one another and design variables in nonlinear manners. Thus, it is not very clear how to modify them to achieve the "best" design or trade-off. This situation becomes even more complex in a multi-discipline optimization that requires several different CAE analyses (e.g., FEA, CFD and NVH) to meet a set of conflicting objectives. To solve this problem, a systematic approach to identify the "best" design, referred to as design optimization, is used.

Optimization of such systems with more than one design objective functions is referred to as multi-objective optimization. Contrary to the single-objective optimization problems, the multi-objective optimization problems do not yield a single optimum solution. Instead, it results in a set of optimal solutions that represent different trade-offs among design objectives. These solutions are referred to as Pareto optimal solutions or Pareto optimal solution set. Design objective function space representation of the Pareto optimal solution set is known as Pareto optimal front or frontier (POF).

One of the problems for obtaining POF in multi-objective design optimization is the requirement of having a large number of experiments (i.e., unique design alternatives in the design space), which can be very expensive in terms of time and/or computing costs.

It would, therefore, be desirable to have methods and systems for efficiently selecting design alternatives in a multi-objective design optimization of a product.

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Systems and methods of conducting multi-objective design optimization of a product using adaptive classification for selecting design alternatives are disclosed. According to one aspect of the present invention, a definition of a design space and an object space for conducting multi-objective design optimization of a product is received in a computer system. The design space is defined by design variables while the objective space is defined by design objectives. A first set of design alternatives is selected in the design space. Each of the first set is evaluated in the objective space for non-dominance. The design space is partitioned into first and second region using a multi-dimensional space division scheme (e.g., support vector machine (SVM)). The first region contains part of the design space containing all non-dominated design alternatives while the second region contains the remaining of the design space. A second set of design alternatives is selected within the first region according to a predetermined selection scheme. A buffer region may be added to the first region for selecting of the second set. Each of the second set and the existing non-dominated design alternatives is evaluated in the objective space for non-dominance. Multi-objective design optimization process repeats the partition of the design space and selection/evaluation of new design alternatives until an end condition is reached.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-7. However, those skilled in the art will readily appreciate that the detailed description given herein with respect to these figures is for explanatory purposes as the invention extends beyond these limited embodiments.

Figure 1A:
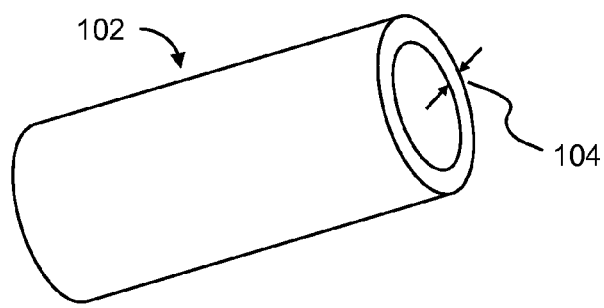
FIG. 1A is a diagram showing a tubular member (an example product) to be optimized using thickness as design variable.

Referring first of FIG. 1A, a tubular structural member 102 (i.e., an exemplary engineering product) is optimized in an engineering optimization with design objective of minimizing the weight therefore minimizing the cost for a given material (e.g., regular strength steel) under certain design loading condition. It is evident that thinner thickness 104 would lead to a less weight structure. However, at certain point, the structural would become too weak to stand a load (e.g., structural failure due to material yielding and/or buckling). Hence, the design optimization of this tubular structure requires another design objective of maximizing the strength, which leads to a safer structure. In this example case, thickness 104 is a design variable, which may have a range (e.g., from one eighth of inch to half an inch) as a design space. Any design alternatives are selected from the design space. In multi-objective design optimization, design alternatives at each iteration are selected from the design space.

The design space is one-dimensional (e.g., a line) when there is only one design variable. The design space becomes a two-dimensional area for two variables, and so on. For more than three design variables, the design space is a hyperspace that is not possible to illustrate.

Figure 1B:
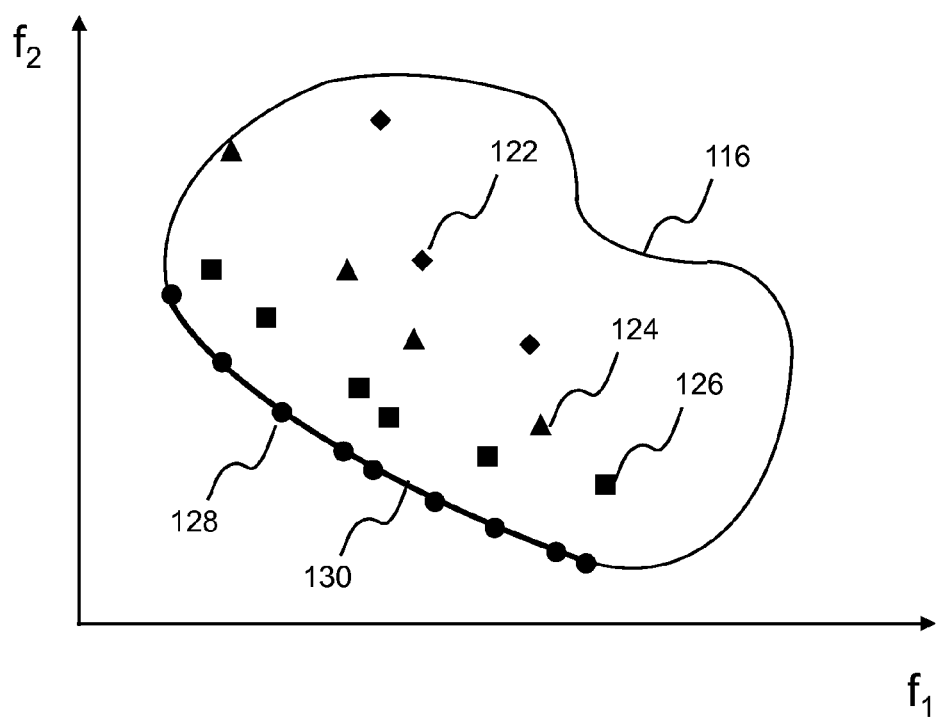
FIG. 1B is a diagram showing example solutions including Pareto optimal solutions in a multi-objective objective space.

Based on two conflicting design objectives, FIG. 1B is an X-Y diagram showing a results of an example design optimization. Two axes represent two different design objectives in form of functions $f_1$ and $f_2$. In a multi-objective optimization, there is no one optimized solution instead there is a set of solutions that reflects tradeoffs among design objectives. In order to differentiate each solution, a concept called non-domination criterion is used for comparing solutions.

Figure 1C:
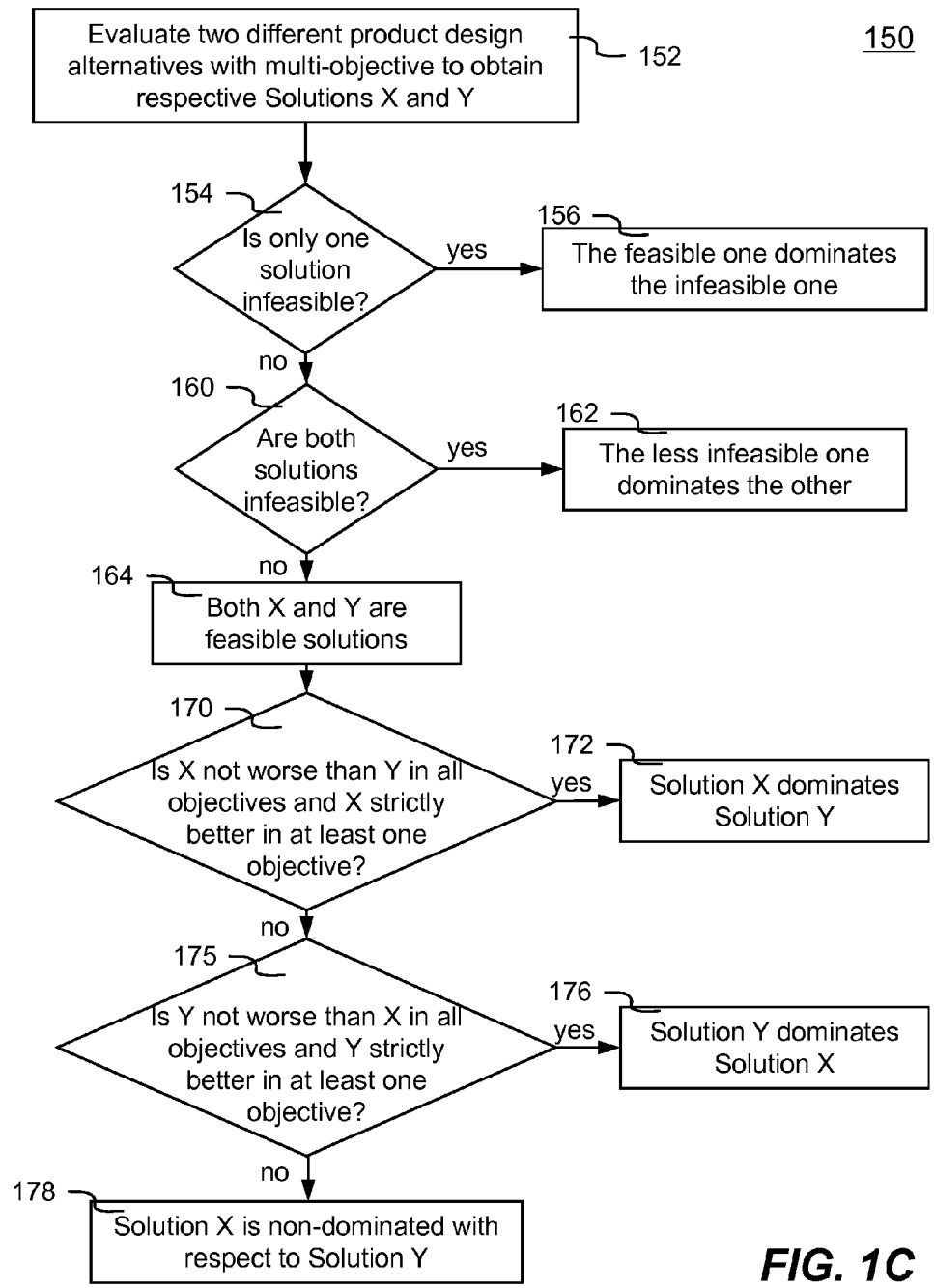
FIG. 1C is a flowchart illustrating an example process of determining non-dominated solution criterion used in implementing one embodiment of the present invention.

FIG. 1C is a flowchart illustrating an example process 150 of determining the non-domination criterion. Two design alternatives are evaluated to obtain respective solutions X and Y according to the design objective functions (i.e., multi-objective). Solution X dominates Y (step 152), if any of the following three conditions is true.
1. X is feasible and Y is infeasible. (Steps 154 and 156)
2. Both X and Y are infeasible (step 160), but X is less infeasible compared to Y (step 162).
3. When both X and Y are feasible (step 164), the following two conditions must be satisfied (steps 170 and 172):
   a. X is not worse than Y in all design objectives; and
   b. X is strictly better than Y in at least one design objective.

Furthermore, one can determine if the solution Y dominates X (steps 175 and 176). Finally, if neither solution dominates the other, X and Y are non-dominated to each other (step 178).

FIG. 1B shows a two-objective unconstrained minimization example. Each dot represents an evaluated solution of a design alternative within area 116. In accordance with the non-domination criterion, for each diamond 122, there is at least one triangle 124 that is better than the diamond 122 in at least one design objective without being inferior in other design objective. So all individual solutions in diamond 122 are dominated by the triangles 124. Similarly, all triangles 124 are dominated by squares 126 and squares are dominated by circles 128. No solution represented by triangles 124 can be said better than any other solution represented by triangles 124, thus they are non-dominated with respect to each other. All individuals represented by circles 128 are non-dominated with respect to any other individual hence having a best or highest rank (e.g., rank of one). If all points represented by circles are removed from FIG. 1B, then the individuals represented by squares 126 become non-dominated with respect to all others. Therefore, squares 128 are assigned next best rank (e.g., rank of two), and so on.

In the example shown in FIG. 1B, circles 128 represent a set of Pareto optimal solution and the line 130 connecting all circles 128 is called the Pareto optimal front. It is noted that there would generally be more than one individual or solution having the same rank.

Figure 2A:
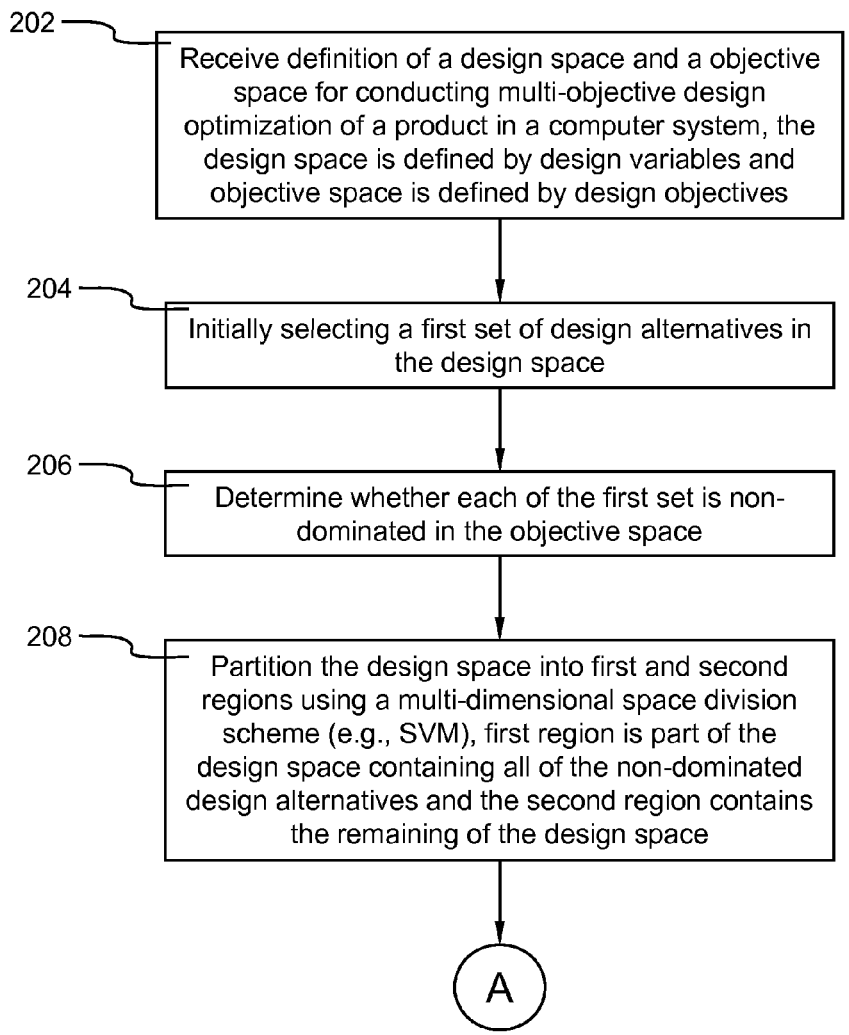
FIGS. 2A-2B collectively show a flowchart illustrating an example process of conducting multi-objective design optimization using adaptive classification for selecting design alternatives, according to an embodiment of the present invention.
Figure 2B:
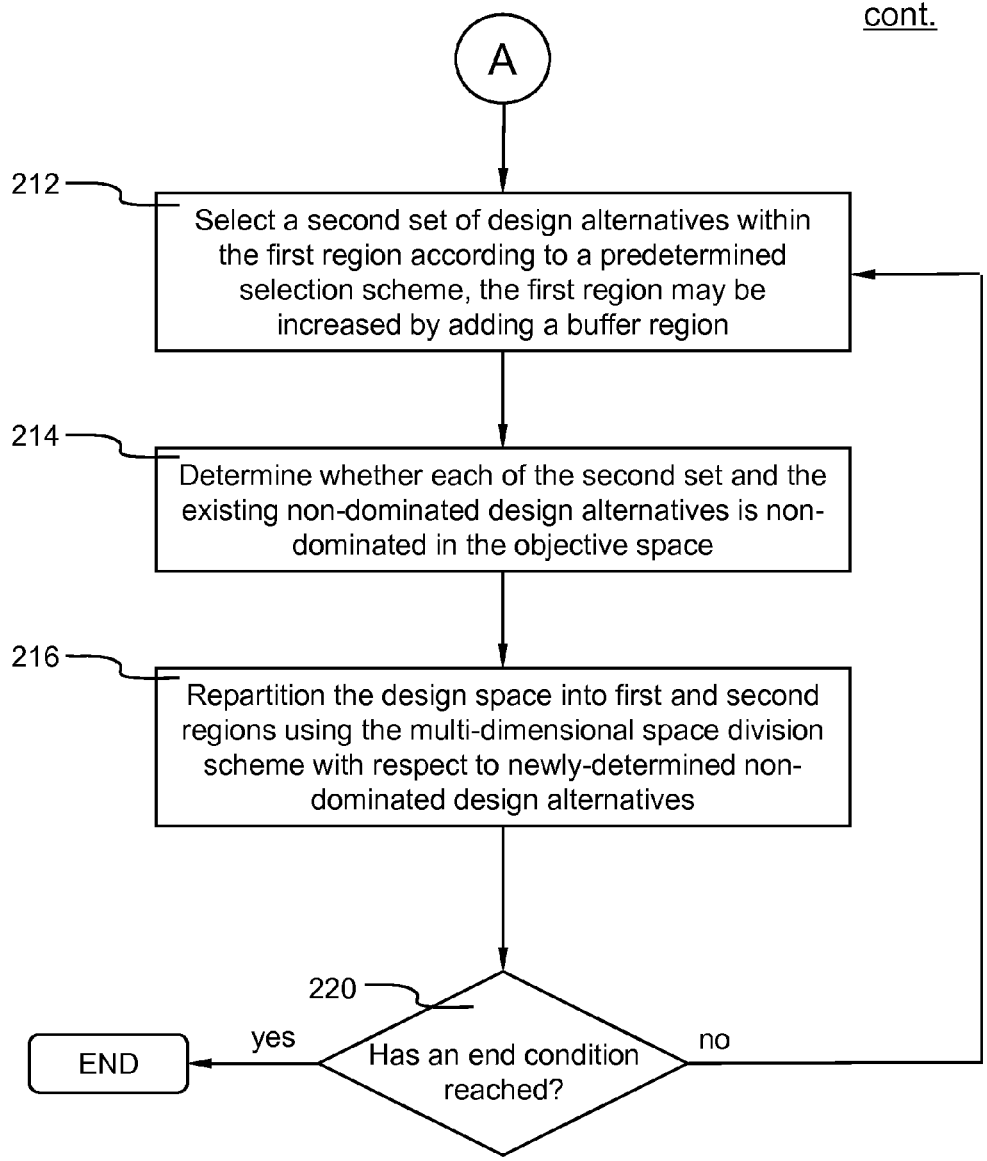

FIGS. 2A-2B show a float chart of an example process 200 of conducting multi-objective design optimization of a product using adaptive classification for selecting design alternatives in accordance with one embodiment of the present invention. Process 200 is preferably implemented in software to be executed in a computer system (e.g., computer system 700).

Process 200 starts by receiving a definition of a design space and an objective space for conducting multi-objective design optimization of a product in a computer system having a design optimization application module (e.g., module 706 in computer system 700) installed thereon at step 202. The design space 300 is defined by a plurality of design variables (e.g., DV1 302 and DV2 304 in FIG. 3) while the objective space is defined by a plurality of design objectives (e.g., $f_1$ and $f_2$ in FIG. 1B).

Figure 3:
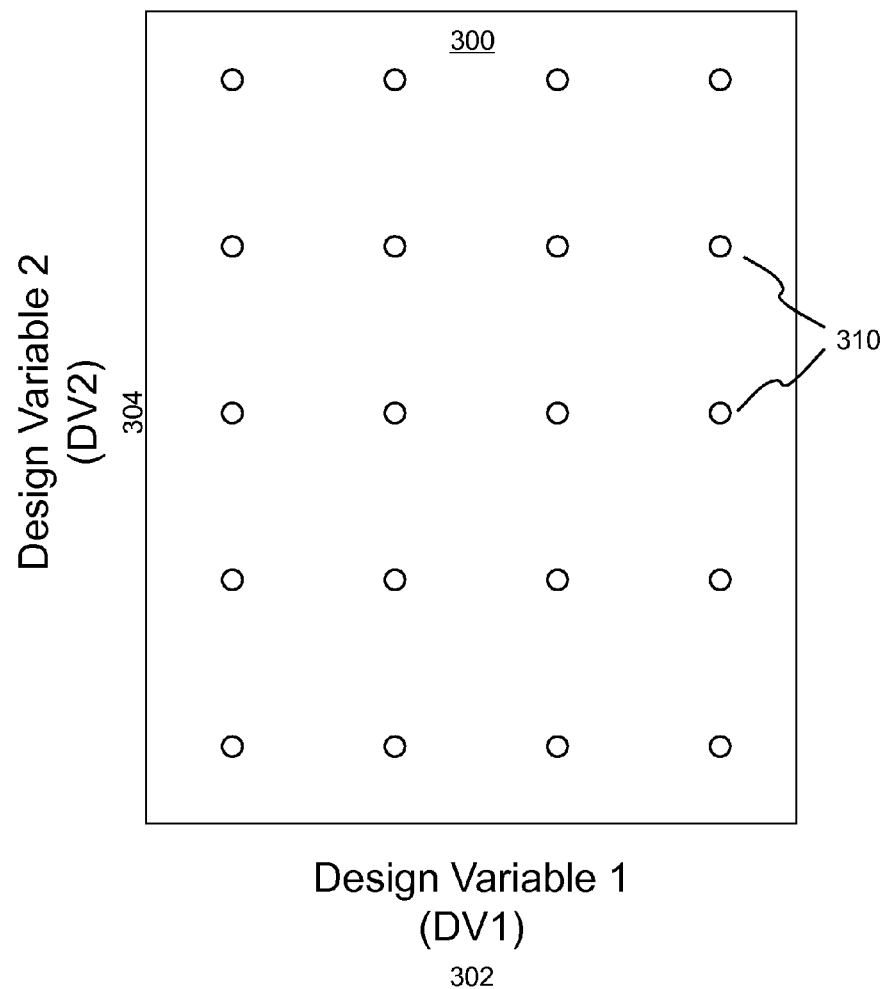
FIG. 3 is a diagram showing a first set of design alternatives uniformly distributed in an example design space according to one embodiment of the present invention.

At step 204, a first set of design alternatives are initially selected in the design space. In one embodiment, the first set is uniformly distributed over the entire design space. FIG. 3 shows an example design space 300 having a first set of design alternatives 310 uniformly distributed. Next, each of the first set is evaluated in the objective space (e.g., FIG. 1B) for determining whether it is non-dominated at step 206.

Figure 4A:
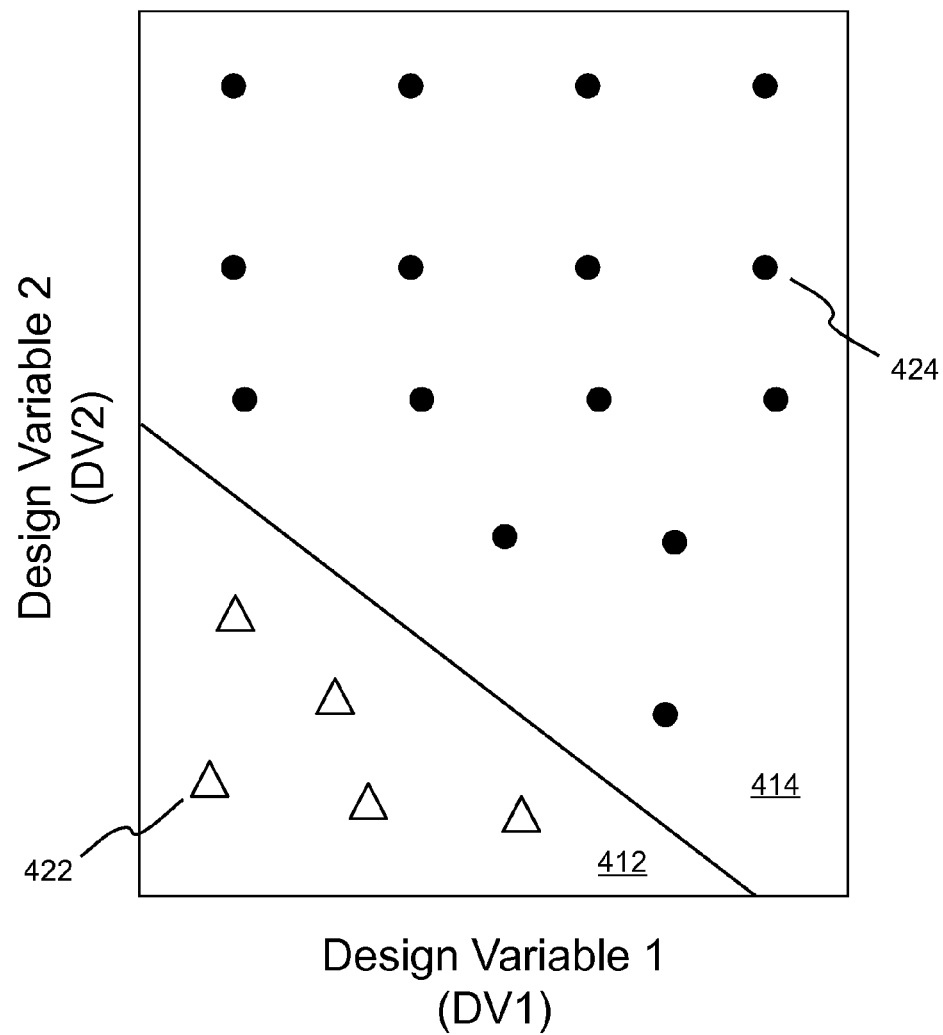
FIGS. 4A-4B show two example design spaces after partition in accordance with one embodiment of the present invention.

At step 208, the design space is partitioned into first and second regions using a multi-dimensional space division scheme. The first region is part of the design space containing all of the non-dominated design alternatives and the second region contains the remaining of the design space. In one embodiment, the multi-dimensional space division scheme is based on a technique referred to as support vector machine (SVM). FIG. 4A shows an example design space partitioned into first and second regions after the first set of design alternatives having been evaluated in the objective space for non-dominance. Example process 150 of evaluation is shown in FIG. 1C. As a result of the partition, the first region 412 contains all non-dominated design alternatives 422 (shown as triangles) while the second region 414 contains the remaining design alternatives 424 (shown as solid circles).

Figure 4B:
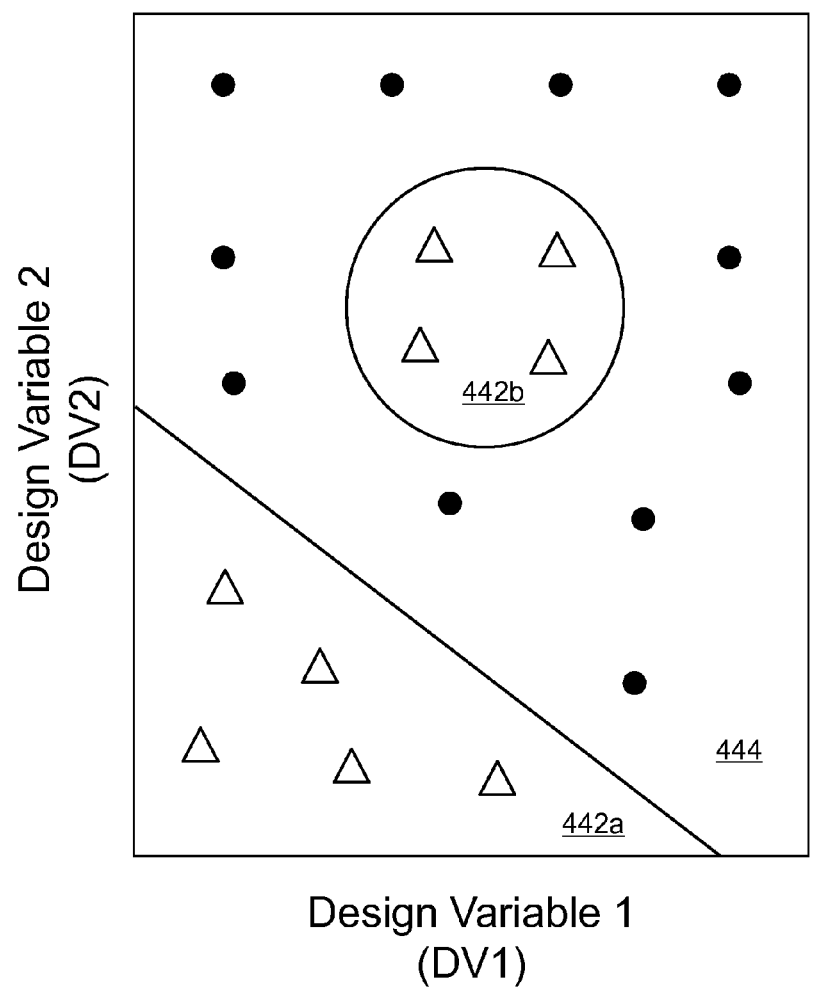

The first region may contain one or more contiguous portions of the design space. Likewise, the second region may also contain one or more contiguous portions of the design space. FIG. 4B shows an example of a design space being partitioned into two first regions 442a-442b and one second region 444. There is no limitation as to how many first and second regions may be resulted in each iteration of the multi-objective design optimization.

Figure 6A:
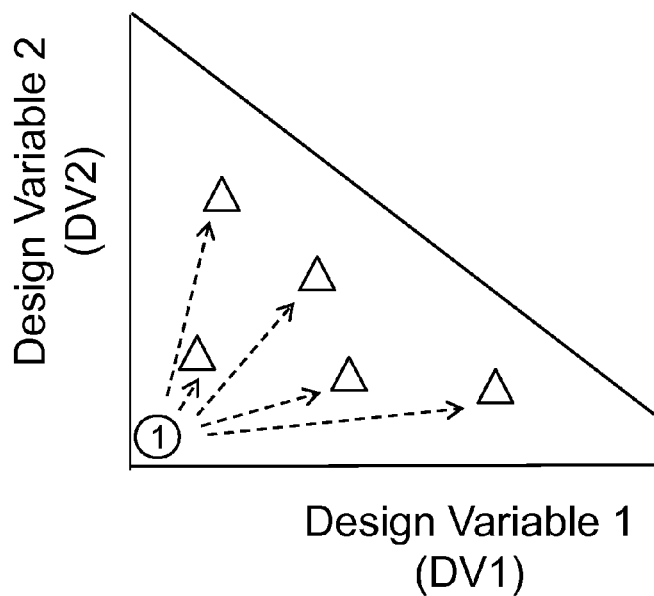
FIGS. 6A-6B are diagrams showing an example design alternative selection scheme of the second set according to an embodiment of the present invention.
Figure 6B:
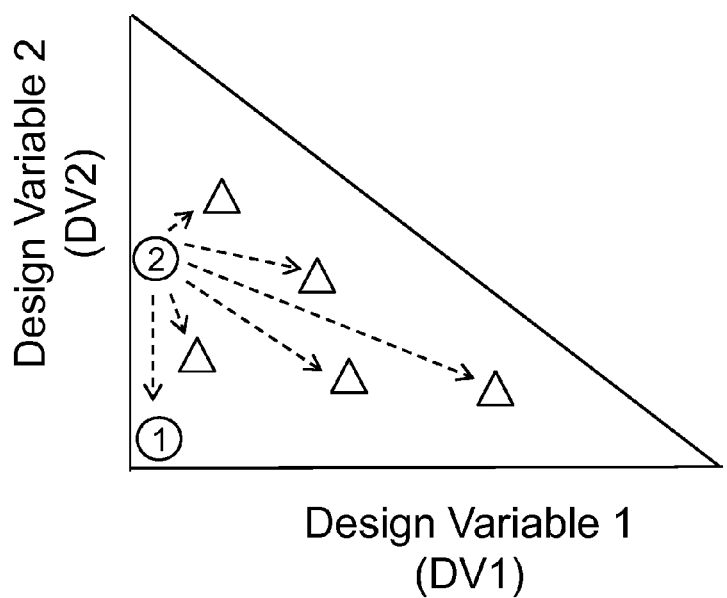

At step 212, a second set of design alternatives 532 is selected among all existing design alternatives (shown as triangles in FIG. 5A) located in the first region 512 (i.e., the region containing all non-dominated design alternatives) according to a predetermined selection scheme, for example, number and location of a new design alternative. In one embodiment, a fixed number of design alternatives are added at each iteration of the multi-objective design optimization. In another embodiment, the predetermined selection scheme is to place a new design alternative in a location having largest minimum distance to existing design alternatives (FIGS. 6A-6B shows such an example in two-dimensional design space).

Figure 5A:
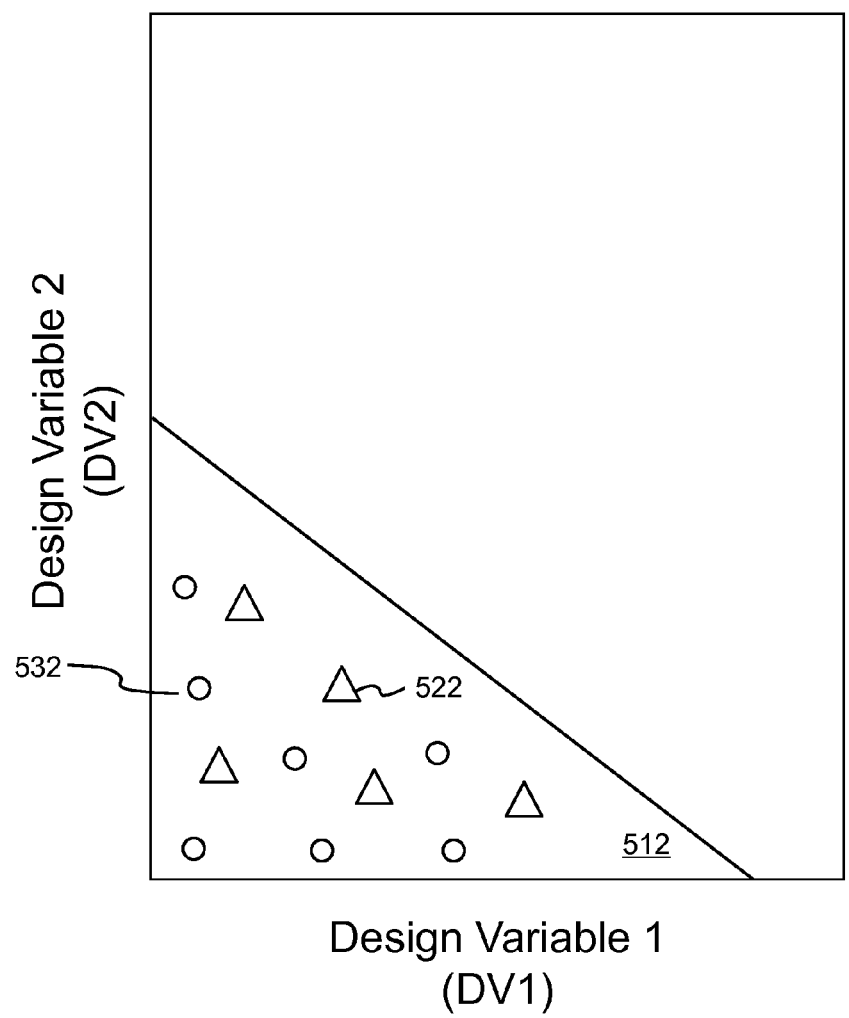
FIG. 5A is a diagram showing a second set of design alternative selected in an example design space according to one embodiment of the present invention.
Figure 5B:
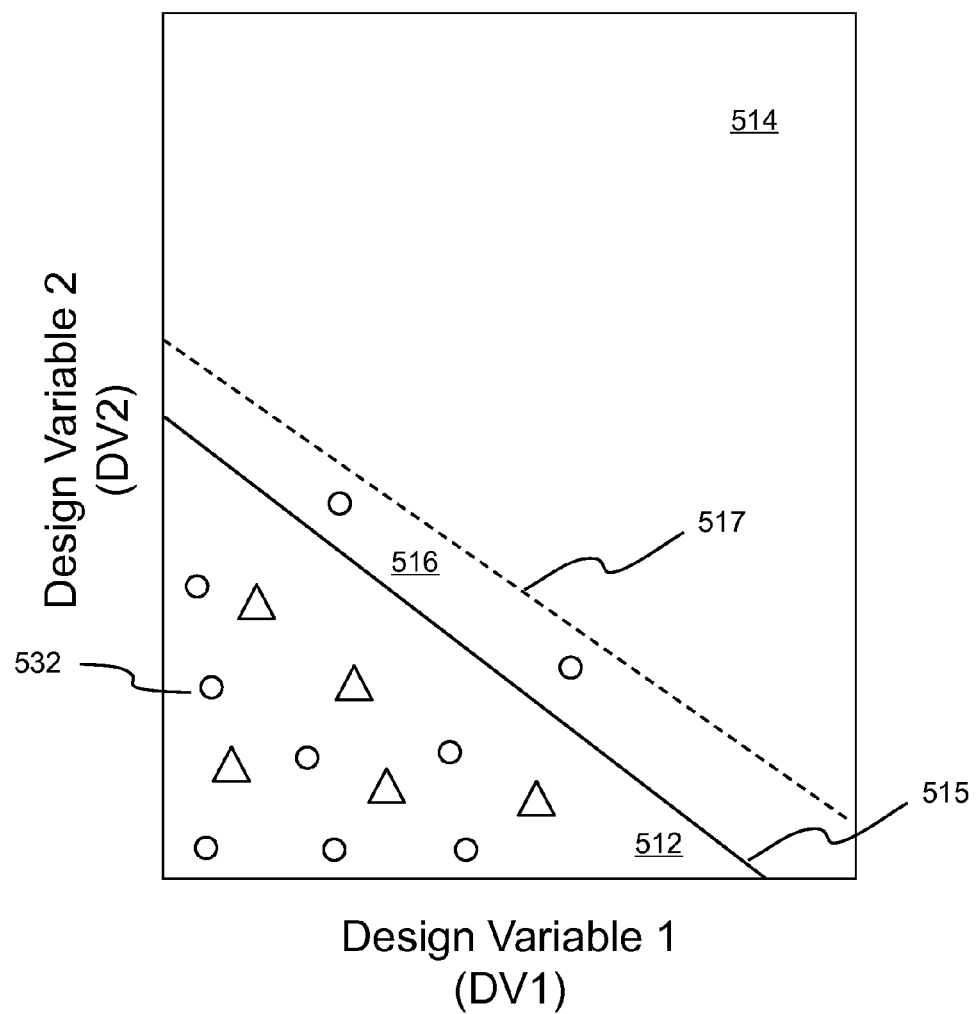
FIG. 5B is a diagram showing an example buffer region used in selecting of a second set of design alternatives, according to an embodiment of the present invention.

In another embodiment, to ensure that additional design alternatives are selected properly, a buffer region 516 of FIG. 5B may be added to the first region 512. The buffer region 516 is located within the second region 514 along the boundary or border 515 between the first region 512 and the second region 514. Furthermore, some of the newly added design alternatives may be selected within the buffer region 516 according to a criterion. For example, a predetermined percentage (e.g., 10%, 20%, etc.) of total added design alternatives for each iteration is selected within the buffer region 516. One example scheme to determine the size of buffer region uses SVM (e.g., if $S(x)=0$ defines the boundary or border 515, a buffer region can be extended to a line/curve defined by $S(x)=-1$).

Next, at step 214, each of the second set (shown as circles 532 in 5A) and the existing non-dominated design alternatives (shown as triangles in FIG. 5A) is evaluated/reevaluated in the objective space for determining whether it is non-dominated. The existing non-dominated design alternatives have been evaluated in the objective space in previous iteration(s). So no objective function evaluation is required for the existing non-dominated design alternatives. However, these existing design alternatives are considered along with newly evaluated design alternatives (second set) to determine whether each of them is still non-dominated. It is noted any of the existing non-dominated design alternative may become dominated at any iteration of the multi-objective design optimization.

After the design alternatives have been determined for non-domination, process 200 moves to action 216 to repartition the design space into first and second regions with respect to the newly-determined non-dominated design alternatives using the multi-dimensional space division scheme.

Then at decision 220, it is determined whether an end condition of the multi-objective design optimization is reached. If not, process 200 follows the "no" branch looping back for another iteration of the multi-objective design optimization by repeating steps 212-214 (i.e., partitioning the design space based on latest evaluation results, selecting more design alternatives in the second set, evaluating each of the second set again) until decision 220 becomes true. Process 200 ends thereafter.

Figure 7:
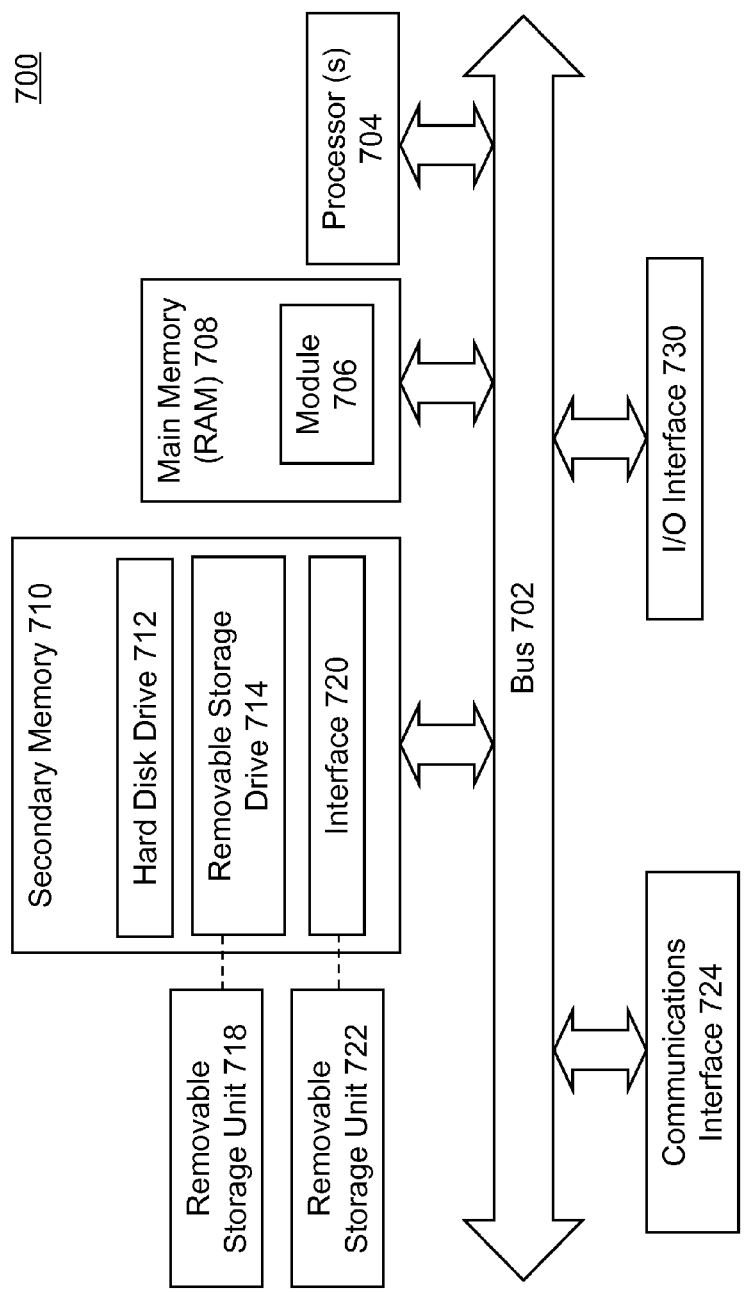
FIG. 7 is a function diagram showing salient components of an example computer system, in which an embodiment of the present invention may be implemented.

According to one aspect, the present invention is directed towards one or more computer systems capable of carrying out the functionality described herein. An example of a computer system 700 is shown in FIG. 7. The computer system 700 includes one or more processors, such as processor 704. The processor 704 is connected to a computer system internal communication bus 702. Various software embodiments are described in terms of this exemplary computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, one or more hard disk drives 712 and/or one or more removable storage drives 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 722 and interfaces 720 which allow software and data to be transferred from the removable storage unit 722 to computer system 700. In general, Computer system 700 is controlled and coordinated by operating system (OS) software, which performs tasks such as process scheduling, memory management, networking and I/O services.

There may also be a communications interface 724 connecting to the bus 702. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724. The computer 700 communicates with other computing devices over a data network based on a special set of rules (i.e., a protocol). One of the common protocols is TCP/IP (Transmission Control Protocol/Internet Protocol) commonly used in the Internet. In general, the communication interface 724 manages the assembling of a data file into smaller packets that are transmitted over the data network or reassembles received packets into the original data file. In addition, the communication interface 724 handles the address part of each packet so that it gets to the right destination or intercepts packets destined for the computer 700. In this document, the terms "computer program medium", "computer readable medium", "computer recordable medium" and "computer usable medium" are used to generally refer to media such as removable storage drive 714 (e.g., flash storage drive), and/or a hard disk installed in hard disk drive 712. These computer program products are means for providing software to computer system 700. The invention is directed to such computer program products.

The computer system 700 may also include an input/output (I/O) interface 730, which provides the computer system 700 to access monitor, keyboard, mouse, printer, scanner, plotter, and alike.

Computer programs (also called computer control logic) are stored as application modules 706 in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. The application module 706, when executed by the processor 704, causes the processor 704 to perform the functions of the invention as described herein.

The main memory 708 may be loaded with one or more application modules 706 that can be executed by one or more processors 704 with or without a user input through the I/O interface 730 to achieve desired tasks. In operation, when at least one processor 704 executes one of the application modules 706, the results are computed and stored in the secondary memory 710 (i.e., hard disk drive 712). The status of the CAE analysis or design optimization (e.g., samples selected based on GA) is reported to the user via the I/O interface 730 either in a text or in a graphical representation.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas the design space and objective space have been shown and described in two-dimensional examples, there is no limitation as to how many dimensions to be used, for example, the present invention can be practiced for multiple design variables with multiple design objectives. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A method of conducting multi-objective design optimization of a product using adaptive classification for selecting design alternatives comprising: (a) receiving a definition of a design space and an objective space for conducting multi-objective design optimization of a product in a computer system having a design optimization application module installed thereon, the design space being defined by a plurality of design variables while the objective space being defined by a plurality of design objectives; (b) initially selecting, by the design optimization application module, a first set of design alternatives within the design space; (c) determining, by the design optimization application module, whether each of the first set is a non-dominated design alternative by evaluating said each of the first set in the objective space, whereby the non-dominated design alternative does not improve all of the design objectives; (d) partitioning, by the design optimization application module, the design space into first and second regions using a multi-dimensional space division scheme, the first region being part of the design space containing all of the non-dominated design alternatives while the second region containing remaining of the design space; (e) selecting, by the design optimization application module, a second set of design alternatives within the first region according to a predetermined selection scheme; (f) determining, by the design optimization application module, whether each of the second sets and the previously-determined non-dominated design alternatives is non-dominated in the objective space; (g) repartitioning, by the design optimization application module, the design space into the first region and the second region using the multi-dimensional space division scheme with respect to the newly-determined non-dominated design alternatives; and (h) repeating (e)-(g) until an end condition of the multi-objective design optimization is reached;

wherein the first region is increased by a buffer region along the first and second region's boundary.

2. The method of claim 1, wherein said first set of design alternatives are uniformly distributed in the design space.

3. The method of claim 1, wherein each of said first and said second regions contains one or more contiguous portions of the design space.

4. The method of claim 1, wherein said predetermined selection scheme comprises placing each of the second set at a location having a largest minimum distance to the existing non-dominated design alternatives.

5. The method of claim 1, wherein the multi-dimensional space division scheme comprises support vector machine.

6. The method of claim 1, wherein said predetermined selection scheme comprises placing some of the second set in the buffer region and the remaining of the second set in the first region.

7. A system for conducting multi-objective design optimization of a product using adaptive classification for selecting design alternatives comprising: a main memory for storing computer readable code for a design optimization application module; at least one processor coupled to the main memory, said at least one processor executing the computer readable code in the main memory to cause the design optimization application module to perform operations by a method of: (a) receiving a definition of a design space and an objective space for conducting multi-objective design optimization of a product, the design space being defined by a plurality of design variables while the objective space being defined by a plurality of design objectives; (b) initially selecting a first set of design alternatives in the design space; (c) determining whether each of the first set is a non-dominated design alternative by evaluating said each of the first set in the objective space, whereby the non-dominated design does not improve all of the design objectives; (d) partitioning the design space into first and second regions using a multi-dimensional space division scheme, the first region being part of the design space containing all of the non-dominated design alternatives while the second region containing remaining of the design space; (e) selecting a second set of design alternatives within the first region according to a predetermined selection scheme; (f) determining whether each of the second sets and the previously-determined non-dominated design alternatives is non-dominated in the objective space; (g) repartitioning the design space into the first region and the second region using the multi-dimensional space division scheme with respect to the newly-determined non-dominated design alternatives; and (h) repeating (e)-(g) until an end condition of the multi-objective design optimization is reached;

wherein the first region is increased by a buffer region along the first and second region's boundary.

8. The system of claim 7, wherein said first set of design alternatives are uniformly distributed in the design space.

9. The system of claim 7, wherein each of said first and said second regions contains one or more contiguous portions of the design space.

10. The system of claim 7, wherein said predetermined selection scheme comprises placing each of the second set at a location having a largest minimum distance to the existing non-dominated design alternatives.

11. The system of claim 7, wherein the multi-dimensional space division scheme comprises support vector machine.

12. The system of claim 7, wherein said predetermined selection scheme comprises placing some of the second set in the buffer region and the remaining of the second set in the first region.

13. A non-transitory computer readable storage medium containing instructions for conducting multi-objective design optimization of a product using adaptive classification for selecting design alternatives by a method comprising: (a) receiving a definition of a design space and an objective space for conducting multi-objective design optimization of a product in a computer system having a design optimization application module installed thereon, the design space being defined by a plurality of design variables while the objective space being defined by a plurality of design objectives; (b) initially selecting, by the design optimization application module, a first set of design alternatives within the design space; (c) determining, by the design optimization application module, whether each of the first set is a non-dominated design alternative by evaluating said each of the first set in the objective space, whereby the non-dominated design alternative does not improve all of the design objectives; (d) partitioning, by the design optimization application module, the design space into first and second regions using a multi-dimensional space division scheme, the first region being part of the design space containing all of the non-dominated design alternatives while the second region containing remaining of the design space; (e) selecting, by the design optimization application module, a second set of design alternatives within the first region according to a predetermined selection scheme; (f) determining, by the design optimization application module, whether each of the second sets and the previously-determined non-dominated design alternatives is non-dominated in the objective space; (g) repartitioning, by the design optimization application module, the design space into the first region and the second region using the multi-dimensional space division scheme with respect to the newly-determined non-dominated design alternatives; and (h) repeating (e)-(g) until an end condition of the multi-objective design optimization is reached.

14. The non-transitory computer readable storage medium of claim 13, wherein each of said first and said second regions contains one or more contiguous portions of the design space;

wherein the first region is increased by a buffer region along the first and second region's boundary.

15. The non-transitory computer readable storage medium of claim 13, wherein said predetermined selection scheme comprises placing each of the second set at a location having a largest minimum distance to the existing non-dominated design alternatives.

16. The non-transitory computer readable storage medium of claim 13, wherein the multi-dimensional space division scheme comprises support vector machine.

17. The non-transitory computer readable storage medium of claim 13, wherein said predetermined selection scheme comprises placing some of the second set in the buffer region and the remaining of the second set in the first region.

* * * * *